United States Patent

[11] 3,616,449

[72] Inventor Oscar Pellegrin
Rochester, N.Y.

[21] Appl. No. 23,552
[22] Filed Mar. 30, 1970
[45] Patented Oct. 26, 1971
[73] Assignee The Bendix Corporation

[54] SPUTTERING ANODE
4 Claims, 2 Drawing Figs.

[52] U.S. Cl. .......... 204/298
[51] Int. Cl. .......... C23c 15/00
[50] Field of Search .......... 204/298, 192

[56] References Cited

UNITED STATES PATENTS 3,340,176 9/1967 Belluso et al. .......... 204/298
3,451,917 6/1969 Moseson .......... 204/298

*Primary Examiner*—John H. Mack
*Assistant Examiner*—Sidney S. Kanter
*Attorneys*—Raymond J. Eifler and Plante, Arens, Hartz, Smith and Thompson

ABSTRACT: An anode particularly adapted to a sputtering system for processing large quantities of substrates. The anode comprises a large rectangular plate having a rectangular aperture therein and a plurality of slots extending from the aperture to compensate for thermal expansion and prevent buckling.

PATENTED OCT 26 1971

3,616,449

OSCAR PELLEGRIN
INVENTOR.

BY Raymond J. Eifler

SPUTTERING ANODE

BACKGROUND OF THE INVENTION

This invention relates to vacuum-processing apparatus and more specifically to an improved anode for the ion-establishing components in a sputtering apparatus.

While not limited thereto, this invention has particular utility in the preparation of thin films of conductive, semiconductive or insulating materials which may be converted into thin film devices and circuits. Due, among other reasons, to their ease of manufacture, volumetric efficiency and reliability, thin-film devices and circuits are attracting wide interest in the electronics and communication industry. In order to minimize the cost of fabrication of thin-film electronics, it is desirable to form the devices and circuitry from standard stock consisting of one or more films of conductive, semiconductive or insulating materials deposited on a nonconductive substrate. For a discussion of the various processing steps which are associated with the conversion of thin films into capacitors and resistors, reference may be had to U.S. Pat. Nos. 2,933,266 to R. W. Berry and U.S. Pat. 3,148,129 to Basseches et al., respectively. For a discussion of vacuum-processing machines for processing a large volume of substrates reference may be had to U.S. Pat. No. 3,340,176 to D. Belluso et al.

As is well known and as shown by the above-mentioned Berry Patent, thin films are commonly formed by vapor deposition or cathodic sputtering. These processes must be performed in an evacuated chamber. While vacuum deposition can be successfully carried on in batch-type operations in an apparatus such as a bell jar, thin-film electronics becomes economically practicable only when uniform coatings are formed on the substrate in a substantially continuous fashion. However, the apparatus for the preferred method of depositing a uniform coating of material upon a substrate, i.e. sputtering, does not in its present form adapt itself to processing large quantities of substrates in a continuous fashion. Examples of triode- and diode-sputtering apparatus may be found in U.S. Pat. No. 3,393,142 to R. M. Moseson and U.S. Pat. No. 3,369,991 to P. D. Davidse et al. respectively.

Sputtering is a mechanism which employs an ionizing discharge or plasma in a controlled gas atmosphere to bombard a negatively biased source material with positively charged gas ions. The gas used may be inert, such as argon, and during sputtering is maintained at a pressure below 10 microns (1 micron equals $1\times10^{13}$ torr). Since the mean free path is quite short at these pressures, it is desirable and necessary to keep the source or target close to the substrate to minimize excess diffusion in the space therebetween. As the negatively biased target or source is bombarded by positively charged argon ions, atoms or groups of atoms of the source material are eroded from the target. These atoms are ejected from the target, strike the substrate, and if conditions are properly controlled, condense on a substrate to form a thin film. In diode sputtering wherein the target or source is the "-cold cathode," the substrate is mounted in the vicinity of the anode facing the cathode. Due to the heat generated by the sputtering process within the confines of the plasma zone, the anode which is not easily water cooled, distorts due to the thermal gradient. This causes distortion of the anode, which distorts the electric field between the anode and cathode, which in turn affects the density of the ion plasma and results in nonuniformity of thickness of the coating on the substrate.

Up to the present time, there have not been any sputtering apparatus capable of continuously processing a high volume of substrates while preventing the anode from distorting during the sputtering process.

SUMMARY OF THE INVENTION

To improve the uniformity of the ion plasma and hence the quality of the coating on the substrate, distortion of the electric field between the anode and cathode of the ion-plasma-generating means is reduced by an improved anode. The invention is characterized by an anode having an aperture to permit material sputtered from the cathode to pass therethrough and deposit upon a substrate, and means for compensating for thermal expansion of the anode to prevent distortion of the anode and hence distortion of the electric field between the anode and cathode. To compensate for thermal expansion, the anode has a plurality of slots which have a direction that intersects the axis of the anode.

Accordingly, it is an object of this invention to provide an improved anode which maintains its shape over a wide range of temperatures.

It is another object of this invention to provide a sputtering apparatus that permits sputtering of material from a cathode onto a substrate disposed parallel to the cathode and an anode.

It is still another object of this invention to provide an improved sputtering apparatus for processing large quantities of substrates.

The above and other objects and features of the invention will become apparent from the detailed description taken in conjunction with the accompanying drawing figure and claims which form a part of this specification.

DESCRIPTION OF THE PREFERRED EMBODIMENT

Figure 1:
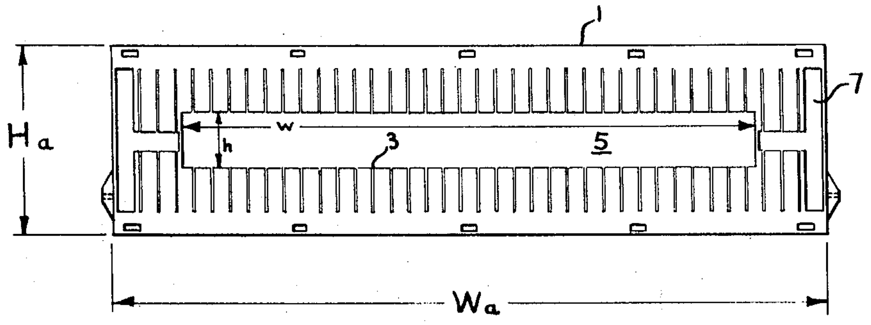
FIG. 1 is a plan view of a preferred embodiment of an anode which accomplishes the objects of the invention.

FIG. 1 shows a plate of material 1, such as stainless steel, which functions as an anode in a sputtering system. The plate 1 has an aperture 5 which is rectangularly shaped. The height ($h$) and the width ($w$) of the aperture 5 are proportional to the height ($H_a$) and width ($W_a$) of the anode and vary with the size of the cathode and distance ($d$) between the anode 1 and cathode (23, FIG. 2). Extending from the aperture and towards the edge of the plate 1 are a series of slots 3. The slots 3 are arranged in parallel relationship and extend in a direction which intersects the longitudinal axis of the plate 1. The purpose of the slots 3 is to prevent the plate 1, when fixedly mounted, from buckling due to thermal expansion when the plate 1 is subjected to high temperatures (greater than 100° C.). The width of a slot is small enough to prevent the passage of sputtered material and/or ions through the slot during sputtering (preferably less than 0.050 inches e.g., 0.032 inches for 22-gauge stainless). To inhibit the flow of ions beyond the plate 1, the edges are flared (9, FIG. 2). Plate 7 is welded to plate 1 to increase the rigidity of plate 1 in a direction perpendicular to the longitudinal axis of plate 1.

Figure 2:
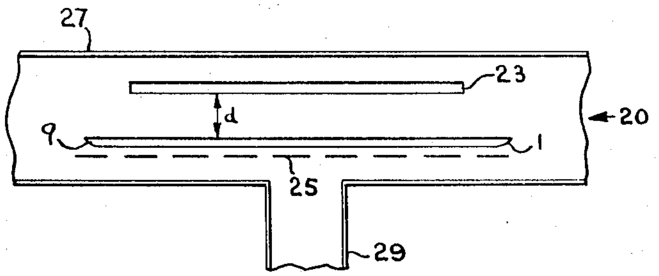
FIG. 2 is a partial diagrammatic view of a sputtering apparatus utilizing an anode of the type shown in FIG. 1.

FIG. 2 shows a partial diagrammatic view of a sputtering apparatus 20 utilizing the plate of material 1 shown in FIG. 1 as an anode 1. The sputtering apparatus 20 includes an evacuable enclosure 27 having an outlet 29 to a vacuum-pumping system (not shown). Located within the evacuable enclosure 27 is a cathode 23 disposed in parallel relationship with the anode 1. Substrates 25 to be processed are located in parallel relationship with the anode 1, and are in alignment with the aperture 5 (FIG. 1) in the anode 1 so that they may receive material sputtered from the cathode 23. During the sputtering process an ion plasma is established between the anode 1 and cathode 23 and the cathode sputters material in the direction of the anode. The substrates 25 located immediately behind the anode 1 and facing the cathode 23 are aligned to appear in the aperture 5 of the anode 1. The cathode, therefore, sputters material onto the substrate. To establish an ion plasma having a substantially uniform ion density between the anode and cathode and adjacent to the substrates 25, the area of the anode 1, facing the cathode 23, should be at least twice as large as the area of the aperture 5 in the anode 1. As mentioned previously, the sputtering process generates large amounts of heat which can cause the temperature of the anode 1 to rise above 200° C. In the absence of some sort of means to compensate for the thermal expansion of the anode, the anode would buckle or distort. The distortion of the anode would then affect the uniformity of the electric field between the anode and the cathode which in turn affects the density of the ion plasma. The variations in the ion plasma then cause variations in the thickness of the material deposited upon the substrate. The slots 3 permit the expansion of the anode 1 in the vicinity of the substrate without adversely distorting the electric field that determines the density of the ion plasma.

EXAMPLE

By experimentation the inventor established the following preferred geometric relationships between the heights and widths of the anode 1, the anode aperture 5 and the cathode 23:

let $w$ = *width of anode aperture;*
$h$ = height of anode aperture; and
$d$ = distance between anode and cathode Then the minimum height of the anode and cathode should be:

Height of anode (Ha)=$h+4d$
Height of cathode (Hc)=$h+2d$ and the minimum width of the anode and cathode should be:

Width of anode ($W_a$)=$w+4d$
Width of cathode ($W_c$)=$w+2d$

Utilizing the above equations the inventor was able to arrange the anode 1 and cathode 23 of the sputtering system 20 to obtain a uniform coating on a plurality of substrates 25.

While a preferred embodiment of the invention has been disclosed, it will be apparent to those skilled in the art that changes may be made to the invention as set forth in the appended claims, and in some cases, certain features of the invention may be used to advantage without corresponding use of other features. For example, although the anode shown has a particular shape and a particularly shaped aperture, these shapes may take various configurations to conform to a particular process and/or particularly shaped substrates. Accordingly, it is intended that the illustrative and descriptive materials herein be used to illustrate the principles of the invention and not to limit the scope thereof.

Having described the invention, what is claimed is:

1. In the combination of a sputtering apparatus of the type having an anode and cathode, the improvement wherein the anode comprises:
a plate having an aperture therein and a plurality of slots extending from the aperture so that when said plate is subjected to thermal expansion buckling of the plate is reduced.

2. The combination as recited in claim 1 wherein the aperture in said plate is rectangular in shape and wherein the slots in said plate have a direction that intersects the longitudinal axis of said plate.

3. The combination as recited in claim 2 wherein the width of said slots is less than 0.050 inches.

4. In a sputtering apparatus of the type having in combination a planar anode having an aperture therein and a plurality of slots extending from the aperture and a planar cathode spaced from and in parallel relationship to the anode, the improvement wherein the height of the anode and cathode comprises:

Height of anode = $h+4d$ and
Height of cathode = $h+2d$ where $h$ is the height of the aperture in the anode and $d$ is the distance between the anode and cathode.

* * * * *